(12) United States Patent
Sollish et al.

(10) Patent No.: US 8,595,390 B1
(45) Date of Patent: Nov. 26, 2013

(54) MULTIPLE SESSION ACCESSIBLITY VIA A CD-ROM INTERFACE

(75) Inventors: Baruch Sollish, Emanuel (IL); Yehuda Hahn, Ofra (IL)

(73) Assignee: SanDisk IL Ltd., Kfar Saba (IL)

( * ) Notice: Subject to any disclaimer, the term of this patent is extended or adjusted under 35 U.S.C. 154(b) by 537 days.

(21) Appl. No.: 11/769,883

(22) Filed: Jun. 28, 2007

Related U.S. Application Data

(60) Provisional application No. 60/940,419, filed on May 28, 2007.

(51) Int. Cl.
*G06F 13/00* (2006.01)
*G06F 3/00* (2006.01)
*G06F 5/00* (2006.01)
*G06F 13/12* (2006.01)
*G06F 13/38* (2006.01)

(52) U.S. Cl.
USPC ............... 710/32; 710/55; 710/74; D14/319

(58) Field of Classification Search
USPC ............................. 710/74, 32, 55; D14/319
See application file for complete search history.

(56) References Cited

U.S. PATENT DOCUMENTS

| | | | |
|---|---|---|---|
| 5,408,630 A | | 4/1995 | Moss |
| 5,581,740 A | * | 12/1996 | Jones ............................ 703/25 |
| 5,598,320 A | * | 1/1997 | Toedtman et al. ....... 361/679.47 |
| 5,652,868 A | * | 7/1997 | Williams ....................... 703/23 |
| 5,841,429 A | * | 11/1998 | Kasaki ......................... 345/551 |
| 5,940,853 A | * | 8/1999 | Ooi et al. ..................... 711/111 |
| 6,360,330 B1 | * | 3/2002 | Mutalik et al. ................ 714/4.1 |
| 6,609,173 B1 | * | 8/2003 | Watkins ........................ 711/103 |
| 6,701,450 B1 | * | 3/2004 | Gold et al. ........................ 714/5 |
| 6,715,043 B1 | * | 3/2004 | Stevens ........................ 711/154 |
| 6,795,803 B1 | | 9/2004 | Tanaka et al. |
| 6,813,669 B1 | | 11/2004 | Cato et al. |
| 6,850,971 B1 | * | 2/2005 | Murakoshi et al. ........... 709/217 |
| 6,950,967 B1 | * | 9/2005 | Brunnett et al. ................ 714/42 |
| 7,111,121 B2 | * | 9/2006 | Oishi et al. ................... 711/115 |
| 7,383,386 B1 | * | 6/2008 | Iyer et al. ..................... 711/115 |
| 7,489,782 B1 | * | 2/2009 | DeVos ......................... 380/278 |
| 7,694,088 B1 | * | 4/2010 | Bromley et al. ............. 711/162 |
| 2001/0017822 A1 | | 8/2001 | Aso et al. |
| 2002/0010785 A1 | | 1/2002 | Katsukawa et al. |
| 2003/0084260 A1 | | 5/2003 | White et al. |

(Continued)

FOREIGN PATENT DOCUMENTS

| EP | 1566726 B1 | 2/2012 |
|---|---|---|
| JP | 7-319709 A | 12/1995 |

(Continued)

OTHER PUBLICATIONS

International Search Report and Written Opinion for International Application No. PCT/IL2008/000722, dated Nov. 14, 2008, 11 pages.

Non-Final Office Action for U.S. Appl. No. 11/769,889 received from the United States Patent and Trademark Office (USPTO) mailed May 25, 2010, 9 pages.

(Continued)

*Primary Examiner* — Farley Abad
(74) *Attorney, Agent, or Firm* — Toler Law Group, PC

(57) ABSTRACT

A method for storing information, the method includes: receiving information to be stored on a removable mass storage device; and storing a compact disc recordable (CDR) session representation on a non-optical re-writable storage area of the removable mass storage device; wherein the CDR session representation comprises the received information.

50 Claims, 9 Drawing Sheets

(56) References Cited

U.S. PATENT DOCUMENTS

| | | | |
|---|---|---|---|
| 2004/0103044 A1 | 5/2004 | Vandewater et al. | |
| 2005/0094501 A1 | 5/2005 | Tsai et al. | |
| 2006/0173980 A1 | 8/2006 | Kobayashi et al. | |
| 2006/0200639 A1* | 9/2006 | Levy et al. | 711/162 |
| 2006/0242459 A1* | 10/2006 | Hyde et al. | 714/15 |
| 2006/0282571 A1* | 12/2006 | Choi et al. | 710/62 |
| 2008/0005471 A1* | 1/2008 | Ma et al. | 711/115 |
| 2008/0010395 A1* | 1/2008 | Mylly et al. | 711/100 |

FOREIGN PATENT DOCUMENTS

| | | |
|---|---|---|
| JP | 9-218751 A | 8/1997 |
| JP | 11-185447 A | 7/1999 |
| JP | 2000-066958 A | 3/2000 |
| JP | 2000-099338 A | 4/2000 |
| JP | 2001-155420 A | 6/2001 |
| JP | 2001-243638 A | 7/2001 |
| JP | 2003-030844 A | 1/2003 |
| JP | 2003-178017 A | 6/2003 |
| JP | 2004-206660 A | 7/2004 |
| JP | 2005-190075 A | 7/2005 |

OTHER PUBLICATIONS

Office Action with English Translation for Chinese Patent Application No. 200880012724.0 received from the State Intellectual Property Office of China (SIPO) dated Apr. 25, 2011, 14 pages.

Second Office Action issued Apr. 12, 2012 in Chinese Application No. 200880012724.0 with English translation, 26 pages.

Communication Pursuant to Article 94(3) EPC mailed Mar. 27, 2012 in European Application No. 08751404.8, 4 pages.

First Office Action issued Jul. 3, 2012 in Japanese Application No. 2010-509948 with English translation, 7 pages.

Office Action issued Aug. 23, 2012 in Taiwanese Application No. 097119562 with English translation, 22 pages.

Communication Pursuant to Article 94(3) EPC issued Sep. 13, 2012 in European Application No. 08751404.8, 4 pages.

Third Office Action issued Aug. 31, 2012 in Chinese Application No. 200880012724.0 with English translation, 11 pages.

Communication pursuant to Article 94(3) EPC issued Jun. 20, 2013 in European Application No. 08751404.8, 5 pages.

Decision of Refusal dated Mar. 5, 2013 issued in Japanese Application No. 2010-509948, with English translation, 6 pages.

* cited by examiner

MULTIPLE SESSION ACCESSIBLITY VIA A CD-ROM INTERFACE

RELATED APPLICATIONS

This application claims priority of U.S. provisional patent Ser. No. 60/940,419 filing date May 28, 2007 which is incorporated herein by reference.

This patent application is related to U.S. patent application Ser. No. 11/769,889, entitled "Removable mass storage device and computer readable medium for storing information," which is filed concurrently with the present application and is hereby incorporated herein, in its entirety, by this reference.

FIELD OF THE INVENTION

The present invention relates to methods for storing information and especially for methods for storing information on a removable mass storage device.

BACKGROUND OF THE INVENTION

The use of compact optical data disks as a means for storing digital data is well known in the art of computer engineering. Relevant published standards include: ECMA-130 $2^{nd}$ Edition—June 1996, "Data interchange on read-only 120 mm optical data disks (CD-ROM)" and ECMA-168 $2^{nd}$ Edition—December 1994, "Volume and File Structure of Read-Only and Write-Once Compact Disk Media for Information Interchange"

The CD-ROM is characterized by an ability to launch a program that is stored on the CD-ROM upon mounting the CD on the host. This ability is typically supplied by an operating system on the host by means of an "Autorun" feature. In addition, the CD-ROM is a read-only media and the operating system prevents an application from writing data onto the CD-ROM.

These two features caused the developers of flash disk drives, such as the DiskOnKey™ available from M-Systems™, Kefar-Sava, Israel, to emulate the CD-ROM paradigm in removable storage devices.

These two features are important in such devices for the following two reasons: (i) The ability to include, in the flash disk drive, applications that are launched upon mounting is convenient and familiar to the user and facilitates supplying any necessary installation software on the device itself (ii) The lack of "write" command protects the programs and data that are not to be changed from erasure during normal operation of the device.

FIG. 1 shows a prior art removable mass storage device 22 with a non-optical re-writable storage area ("storage area") 20 that includes a read-only partition (CD ROM partition) 22 and a read-write partition (writable partition) 24. The non-optical re-writable storage area 20 can be implemented by Flash technology.

Generally, the partitioning is done during the manufacturing process of the removable mass storage device. It is convenient to present these partitions to an operating system by means of standard interfaces.

Non-optical re-writable storage area 20 is divided into a read-only partition 22 and a read/write partition 24. A controller 28 provides access to the partitions to a host computing device 34 and applications running on the host by means of standard interfaces: a CD-ROM interface 30 (as described in ECMA-168) and a mass-storage device interface 32. The physical interface to the host is by means of a link. Controller 28 is responsible for translating the standard interfaces presented to the host into the appropriate commands understood by the underlying flash memory.

There is, however, an additional requirement, which is to be able to update the content stored on the emulated CD-ROM. This content is updated using a separate API.

Updating the entire emulated CD-ROM is risky because data can be corrupted during the update. For example, a user can unwittingly remove the device while an update is in progress. In this case, the contents of the emulated CD-ROM are likely to become corrupted. As a result, the CD partition may be unusable, thereby rendering the device as a whole unusable. A second problem in updating is the potential lengthy amount of time required to replace the entire contents of the CD partition.

These two deficiencies do not apply to CDs because CDs cannot be rewritten.

FIG. 2 illustrates a prior art update process of CD-ROM partition 22 within a removable mass storage device 22. This update typically occurs after the manufacturing process is completed. A CD-ROM partition image 42, precedes a writeable partition 44, which together form the total capacity of the storage device. When the CD-ROM partition has to be updated (by a later version or by new content), an application (not shown) creates an updated version of the CD-ROM partition 40 and replaces 46 the old partition 42A by the new partition 40A. Typically, the new partition 40A is larger than the old partition 42, so the writeable partition 48 has to be smaller than the original writeable partition 44. The result is a CD-ROM with an updated partition.

It would be very useful to have a storage device comprising an incrementally and safely updatable CD partition that can be updated many times.

SUMMARY OF THE PRESENT INVENTION

A method for storing information, the method includes: receiving information to be stored on a removable mass storage device; and storing a compact disc recordable (CDR) session representation on a non-optical re-writable storage area of the removable mass storage device; wherein the CDR session representation comprises the received information.

A method for storing information, the method includes: receiving information to be stored on a removable mass storage device; storing a session representation on a non-optical re-writable storage area of the removable mass storage device; wherein the session representation comprises the received information; and generating metadata representative of representations of multiple sessions that are stored on the non-optical re-writable storage area.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
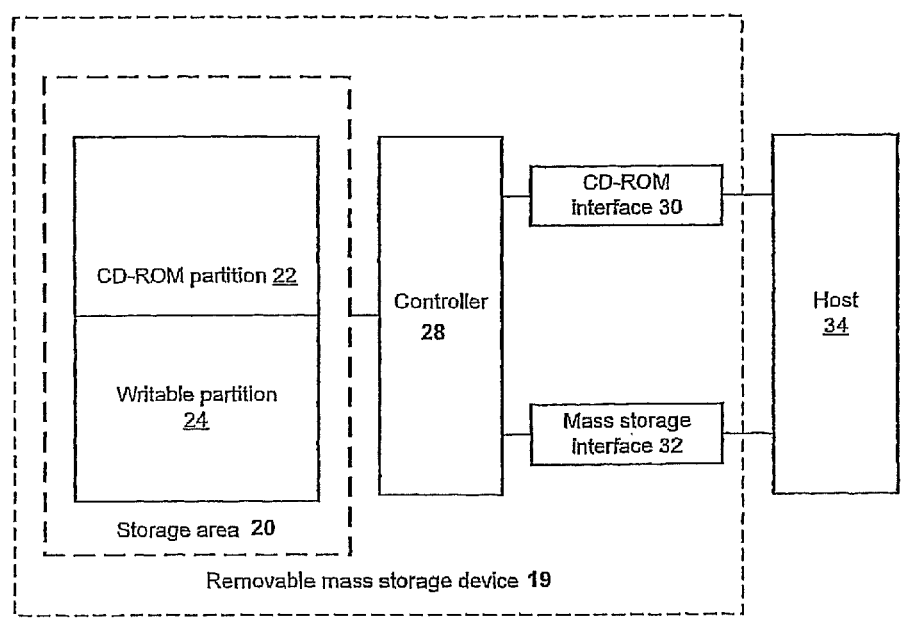
FIG. 1 is a simplified block diagram of a prior art removable storage device configured with an emulated CD-ROM partition.
Figure 2:
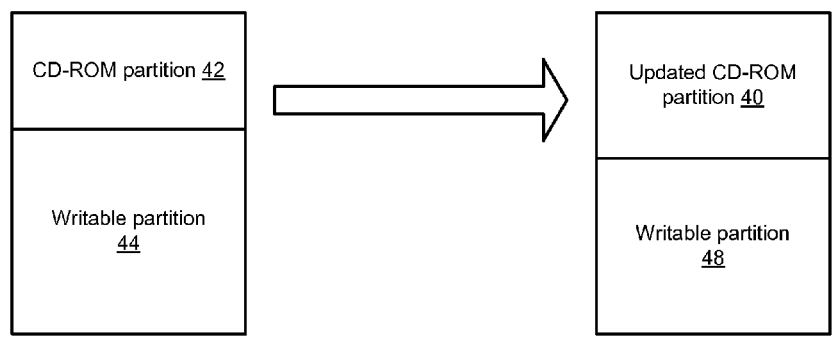
FIG. 2 is a flow chart of a prior art method of updating an emulated CD-ROM partition.

The term "Recordable Compact Disk" (also referred to as CDR) can be interpreted in the normal conventional sense, as well as meaning a CDR according to the International Standards Organization Standard 13490-1 International Electrotechnique Commission (CEI-IEC) 908 and ISO/IEC 10140. The term "session" can be interpreted in the normal conventional sense, as well as meaning an area in a CD-ROM or a CDR as defined in the standard ECMA 168/3 of the European Computer Manufacturers' Association.

The term "CDR partition" can be interpreted in the normal conventional sense, as well as meaning a portion of a non volatile memory that is presented to an ordinary host applications as a CD-ROM while being rewriteable by an authorized entity. A CDR partition can include representations of one or more CDR sessions.

The term "removable Mass Storage Device" can be interpreted in the normal conventional sense, as well as meaning a non-optical storage device designed to be mounted and removed from a host as part of normal operation.

The term "CDR session" can be interpreted in the normal conventional sense, as well as meaning a session of a CDR as defined in the Standard 130 of the European Computer Manufacturers' Association (ECMA). A "session" can mean a temporal session. For example, a first session can occur during a first time period, and a second session can occur during a second time period that is distinct from the first time period and that is separated from the first time period by an interim time period. In one illustrative example, during the interim time period no information is written to a storage area. In another illustrative example, during the interim time period no information is read from a source such as a CD-ROM. In yet another illustrative example, during the interim time period no information is read from a source such as a CD-ROM and no information is written to a storage area.

Conveniently, a removable mass storage device is provided. It includes a CDR interface that is utilized instead of a CD-ROM interface.

Accordingly, representations of one or more CDR sessions are stored on a non-optical re-writable storage area of a removable mass storage device. A controller of the removable mass storage device can participate in an emulation of a CD-R device or of a CD-ROM device.

A CDR interface can be generated by updating a CD-ROM interface, for example by extending its capabilities to update and append content, for example as defined in Annex C of the ECMA 168/3 standard. According to another embodiment of the invention updates to the CDR session representations are made via a dedicated API.

According to an embodiment of the invention the system and method for storing information do not allow an update (re-write) of a CDR session representation but rather only adds representations of other CDR sessions.

According to another embodiment of the invention updating of a CDR session representation is allowed.

Conveniently, a CDR session representation includes a next CDR session pointer. This pointer can point to another CDR session representation. The next CDR session pointer can also point to an area that does not store a CDR session representation. In the latter case the controller or a host that interacts with the controller can determine that the next CDR session pointer belongs to the most updated CDR session representation.

By writing information in sessions an error that occurs during the writing process of one CDR session representation does not damage other CDR session representations.

Yet according to an embodiment of the invention a pointer to a new CDR session representations is updated to point to that new CDR session representation only after a successful completion of writing (and optionally checking) of that new CDR session representation to the removable mass storage device. This so-called late update mechanism minimizes the risk that data corruption in writing the new CDR session representation will cause an irreversible error in the data integrity—if the writing of the new CDR session representation fails, the next CDR session pointer (also referred to as "pointer") is not updated, and the update fails, leaving the previous version intact.

In yet another embodiment of the invention, a non-optical re-writable storage area acts as a double buffer—one area is allocated for a "current" CDR session representation from which information can be read while another area is allocated for receiving the "next" CDR session representation. The method and system can toggle between these two areas. The replacement of one CDR session representation by another includes altering pointers such as not to point to an area that is going to be re-used. According to an embodiment of the invention the alteration may involve updating a shadow directory.

In yet another embodiment of the invention, the new CDR session representation is written on top of an older CDR session representation.

Conveniently, multiple sessions representations are stored in a non-optical re-writable storage area, emulated as a multi-session CD-R. In order for a host system to access representations of CDR sessions beyond the first CDR session representation, the controller has to support additional multi-session-related commands that enable the system to determine the location of the last CDR session representation. These commands can be part of the SCSI Multimedia command set in Annex I of MMC-3.

Conveniently, a PVD (Primary Volume Descriptor) and associated directory are present in every CDR session representation (they can start at sector address 16 relative to the start of the CDR session representation). The operating system can follow pointers to the PVD of the last session.

According to another embodiment of the invention representations of multiple CDR sessions are stored in a non-optical re-writable storage area, and additional information in the form of a shadow directory (physically stored in the non-optical re-writable storage area or computed on the fly by the controller). By means of the shadow directory, the stored multi-session CDR is presented to the host as a single session CD-ROM. This obviates the need for the controller to support multi-session commands.

Conveniently, the controller follows pointers (also referred to as next CDR pointers) and when the operating system requests the PVD of the first session, the controller returns a shadow PVD that references the shadow structure. The operating system never knows that it is dealing with multi-sessions.

Conveniently, the original PVD and directories of each CDR session representation are left intact. This can assist in case reversion to a previous session is desired (such as in the case of a serious bug in an updated CDR session representation).

The shadow PVD is generated by adjusting its directory pointers to point to the directory in the last CDR session representation instead of the first. In addition, the volume size in the shadow PVD is increased to include the last sector of the last CDR session representation instead of the last sector of the first CDR session representation.

Figure 3A:
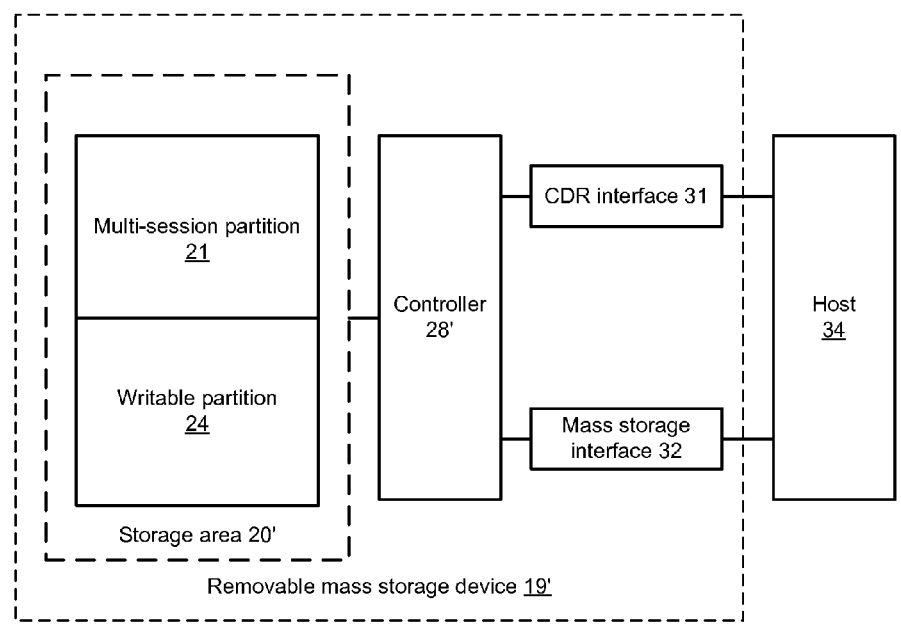
FIG. 3A is a simplified block diagram of a removable storage device configured with an emulated multi session partition according to an embodiment of the invention.

FIG. 3A is a simplified block diagram of a removable mass storage device 19 configured with an emulated CDR partition 23 according to an embodiment of the invention.

Removable mass storage device 19' includes a non-optical re-writable storage area ("storage area") 20' that includes a multi-session partition 21 and a read-write partition (writable partition) 24. The non-optical re-writable storage area 20' can be implemented by Flash technology. Multi-session partition 21 can include an initial CDR session representation that is written to storage area 20' during the manufacturing process of removable mass storage device 19.

Controller 28' provides access to the partitions by a host computing device 34, and by applications running on the host, via standard interfaces: a CDR interface 31 (that can comply with the ECMA-130 standard) and a mass-storage device interface 32. The physical interface to the host 34 is by means of a link. Controller 28' is responsible for translating the standard interfaces presented to the host 34 into the appropriate commands understood by the underlying flash memory. As will be further illustrated below, the multi-session partition 21 can store one or more CDR session representations.

Figure 3B:
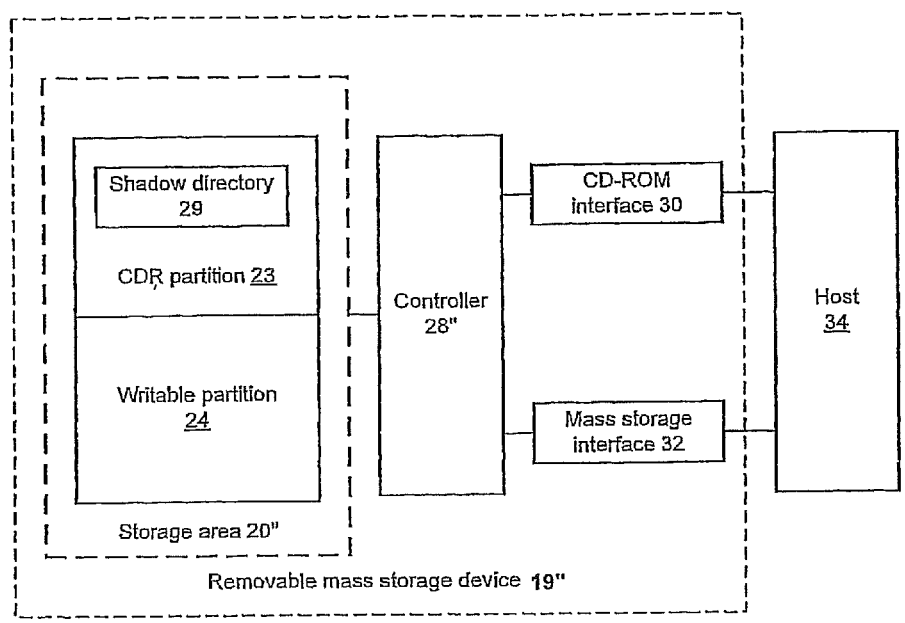
FIG. 3B is a simplified block diagram of a removable storage device configured with an emulated CDR partition according to another embodiment of the invention.

FIG. 3B is a simplified block diagram of a removable mass storage device 19" configured with a CDR partition 23 according to an embodiment of the invention. Device 19" differs from device 19' by: (i) including a CD-ROM interface 30 instead of having a CDR interface 31, (ii) including CDR partition 23 instead of multi-session partition 21, (iii) including controller 28" that can have a different functionality from the functionality of controller 28', (iv) including shadow directory 29.

A single session CD-ROM has a single session starting with a PVD (Primary Volume Descriptor) at sector 16. The PVD points to the directory area of the session. The directory area includes a directory that includes names of files and/or directories and their sector offsets relative to the start of the session.

When reading a CD-ROM, an operating system goes to the PVD from which it knows exactly how to find all directories/files on the CD-ROM.

In a multi-session CD (such as CD-R), each session has its own PVD and a directory area that includes the names and offsets of the files/directories visible in that session.

Controller 28" can follow pointers from one session representation to another session representation (for example—pointers 53 and 55 of FIG. 4, pointers 72, 74, 76 and 78 of FIG. 5 and pointer 92 of FIG. 6) until obtaining the most recent session representation PVD and directory area. After obtaining all PVD and directories of valid session representations controller 28" can generate a shadow directory.

If an operation system wishes to access information stored on the multi-session partition 23 the controller will send it the shadow PVD that will point to the shadow directory, as if the shadow PVD is located at sector 16 of a CD-ROM. The operating system will view a single session CD-ROM while the multi-session partition 23 will store representations of multiple sessions.

Controller 28" can generate the shadow directory by calculating sector offsets (all offsets can be related to a virtual sector 16). The shadow directory can be updated once a new session representation is added or once an old session representation is deleted.

It is noted that the controller 28" can also calculate the offset on the fly.

Figure 4:
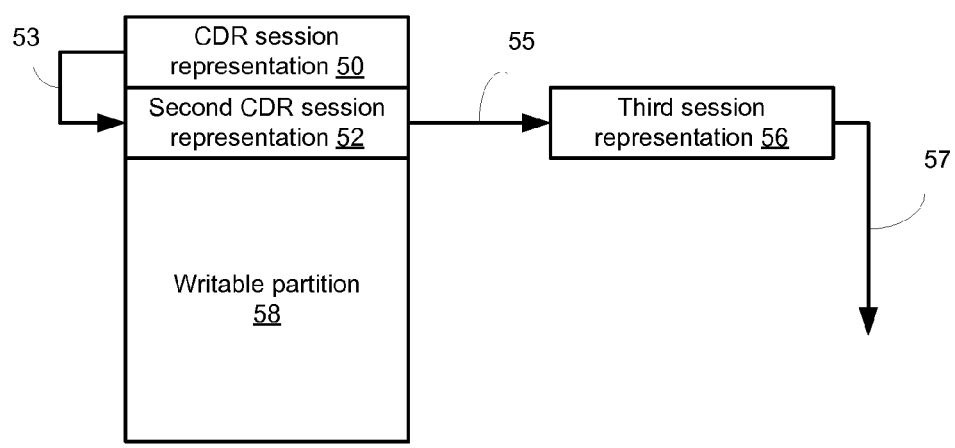
FIGS. 4-6 illustrates different configurations of a non-optical re-writable storage area of the removable mass storage device according to an embodiment of the invention.

FIG. 4 shows an embodiment of the invention in which a next CDR session pointer 57 of the third session representation 56 (the most updated CDR session representation) initially points to a location in the non-optical re-writable storage area 20' that does not store a CDR representation (in a real CDR this pointer would point to an invalid address). CDR session representation 50 includes a next CDR pointer 53 that points to second CDR representation 52.

A third CDR session 56 can be added, and a next CDR pointer 55 of second CDR session representation 52 will be updated such as to point to third CDR session representation 56. The next CDR pointer 57 of the third CDR session 56 can point to an area that does not store a CDR session representation.

Additionally or alternatively, the whole CDR partition 23 can be replaced.

Conveniently, the next CDR pointer 55 of the second CDR session representation 52 is updated to point to the third CDR session representation 56 only after controller 28' confirms that the third CDR session representation 56 has been received and written correctly (for example, by comparing a hash performed on the content read from the new session with a hash value received separately from the update application).

Figure 5:
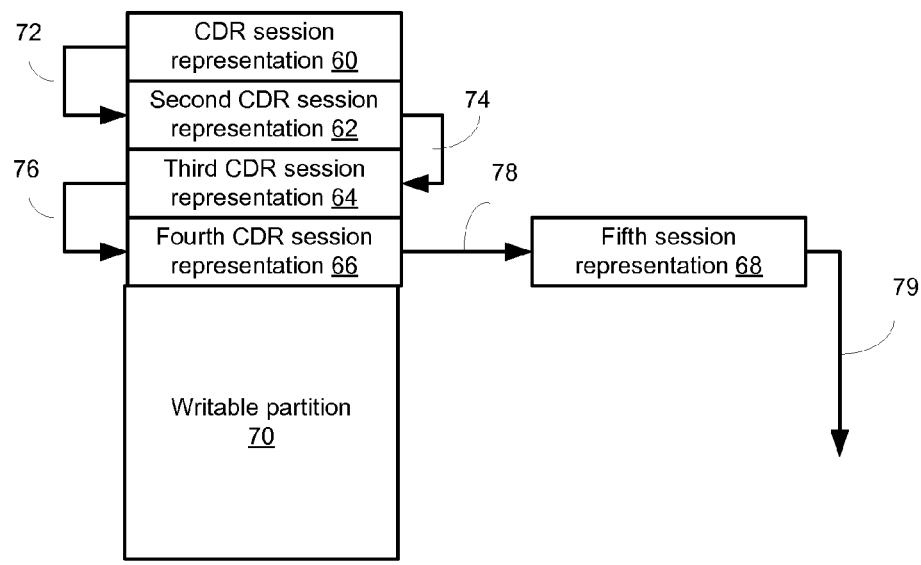

FIG. 5 shows five CDR session representations according to an embodiment of the invention.

The five CDR session representations 60-68 are arranged in a sequential manner, while one CDR session representation points to the next CDR session representation. Each CDR session representation includes a next CDR session pointer that points to the next CDR session representation—if such exists. CDR session representation 60 can be the initial CDR session representation that was written during the manufacturing process of the removable mass storage device 19'. Whenever an additional CDR session representation is added, it is pointed to by the previous CDR session representation (for example—CDR session representation 66 points to CDR session representation 68.).

When controller 28" accesses the CDR session representations, it searches for the most updated CDR session representation, the one whose next CDR pointer points to an invalid location. Once found it can generate shadow directory 29.

Figure 6:
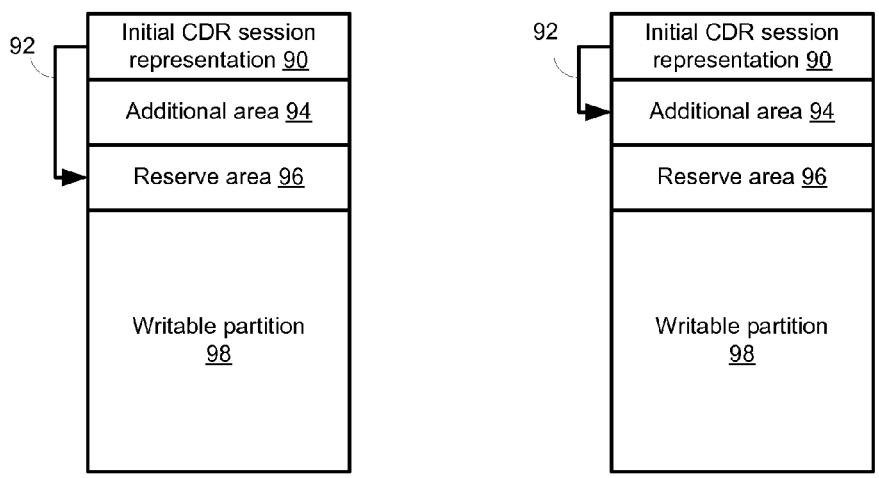

FIG. 6 shows an emulated multi-session CDR partition with direct linking according to an embodiment of the invention.

During the manufacturing process the non-optical re-writable storage area 20' can be partitioned during the manufacturing process such as to include an initial CDR session representation (also referred to as base image) 90, an additional area 94 for storing additional content that may be updated during the life of the device and reserve area 96 that is left unused to serve as a reserve for future use.

The non-optical re-writable storage area 20' further includes a writable portion 98 that is not affected by CDR updates.

Initially, as illustrated by the right side of FIG. 6, next CDR session representation pointer 92 (that belongs to CDR session representation 90) points to additional area 94.

As illustrated by the left side of FIG. 6, after a newer CDR session representation is written to reserve area 96, next CDR session pointer 92 can point to that newer reserve area, thus allowing a re-use of additional area 94.

It should be noted that as abandoned areas are re-used for new sessions, a fragmentation situation can occur, and repetitive use of abandoned areas may cause a cumulative fragmentation problem. Therefore, as part of the present invention, a mechanism for de-fragmentation (such as is well known in the art of personal computing) is to be included in the removable mass storage device. This mechanism is to be applied periodically to de-fragment the storage device.

This method prevents the corruption of data if power is lost while the additional data area is being written, since the CDR session pointer is not updated until the data is validated.

Figure 7:
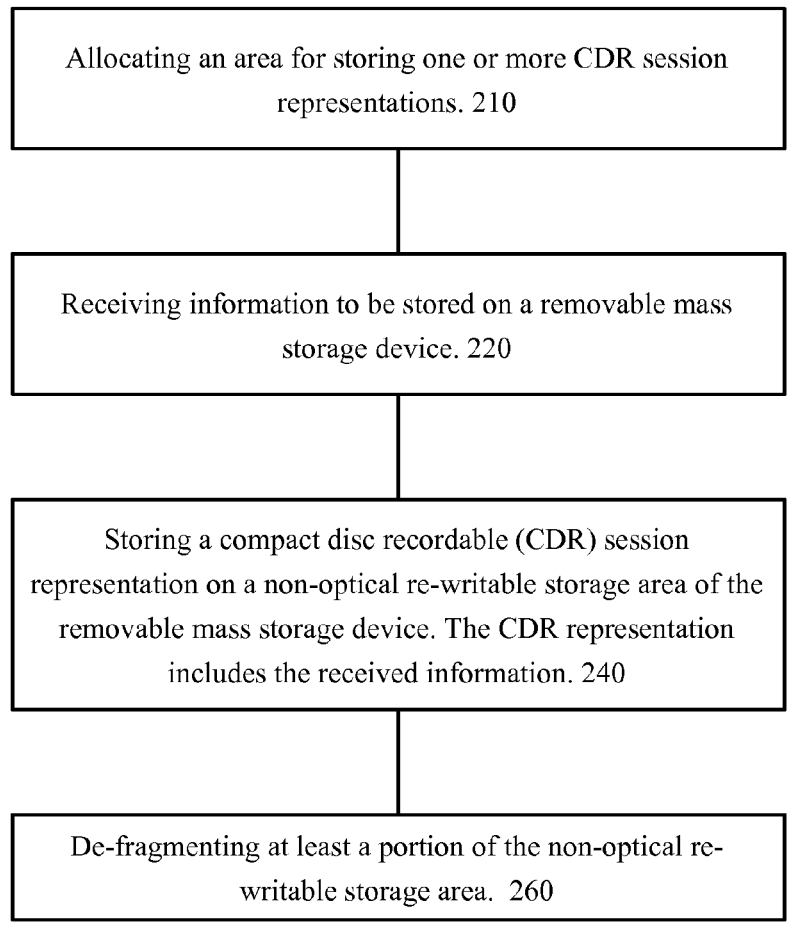
FIG. 7 is a flow chart of a method for storing information, according to an embodiment of the invention.

FIG. 7 is a flow chart of method 200 for storing information, according to an embodiment of the invention.

Method 200 starts by stage 210 of allocating an area for storing one or more CDR session representations. Various allocation schemes were illustrated in the previous figures. The allocation can include allocating a reserved area, allocating an area that can store one or more CDR session representations, and the like. The allocation can be executed during a manufacturing process of the removable mass storage device or during removable mass storage device updates, configuration sessions and the like.

Stage 210 is followed by stage 220 of receiving information to be stored on a removable mass storage device.

Stage 220 is followed by stage 240 of storing information representative of a compact disc recordable (CDR) session on a non-optical re-writable storage area of the removable mass storage device. The CDR session representation includes the received information.

Conveniently, stage 240 can include at least one of the following stages, or a combination thereof: (i) writing a pointer from CDR session representation to information representative of another CDR session after the other CDR session is successfully written to the non-optical re-writable storage area; (ii) re-using an area allocated for storing information representative of an abandoned CDR session, (iii) storing information representative of a linked sequence of CDR sessions; (iv) storing information representative of linked CDR sessions that are stored in a non-sequential order; (v) generating a next session link that points to an area that stores information that differs from a representation of a CDR session (vi) toggling between areas allocated for storing information representative of CDR sessions; (vii) confirming that CDR session representation was successfully written to the non-optical re-writable storage area.

Conveniently, stage 240 is repeated multiple times such as to store representations of multiple CDR sessions on the non-optical re-writable storage area. Stage 240 can be repeated at least three times, but this is not necessarily so.

It is noted that stage 240 can include re-using an area that was previously allocated to a now-abandoned CDR session representation. Additionally or alternatively, stage 240 can include writing a CDR session representation to a reserved area that was not previously used. This can occur when the reserved area can include multiple CDR session representations.

The first embodiment (re-using area) can accommodate a large number of updates. The second embodiment (allocating a large enough area to store multiple CDR session representations) can be used for storing information representative of multiple CDR session representations and once the area is filled at least some of the area can (optionally) be re-used.

Conveniently, stage 240 is followed by stage 260 of de-fragmenting at least a portion of the non-optical re-writable storage area. It is noted that the de-fragmenting can occur per a predefined repetitions of stage 240, per a certain period, in response to a status of the removable mass storage device, and the like.

After the storage of information is completed, the removable mass storage device can be accessed. When the CDR partition is accessed a controller or an operating system can search for the most updated CDR representation. The searching can include searching for a next CDR session link that points to an area that stores information that differs from a representation of a CDR session.

Figure 8:
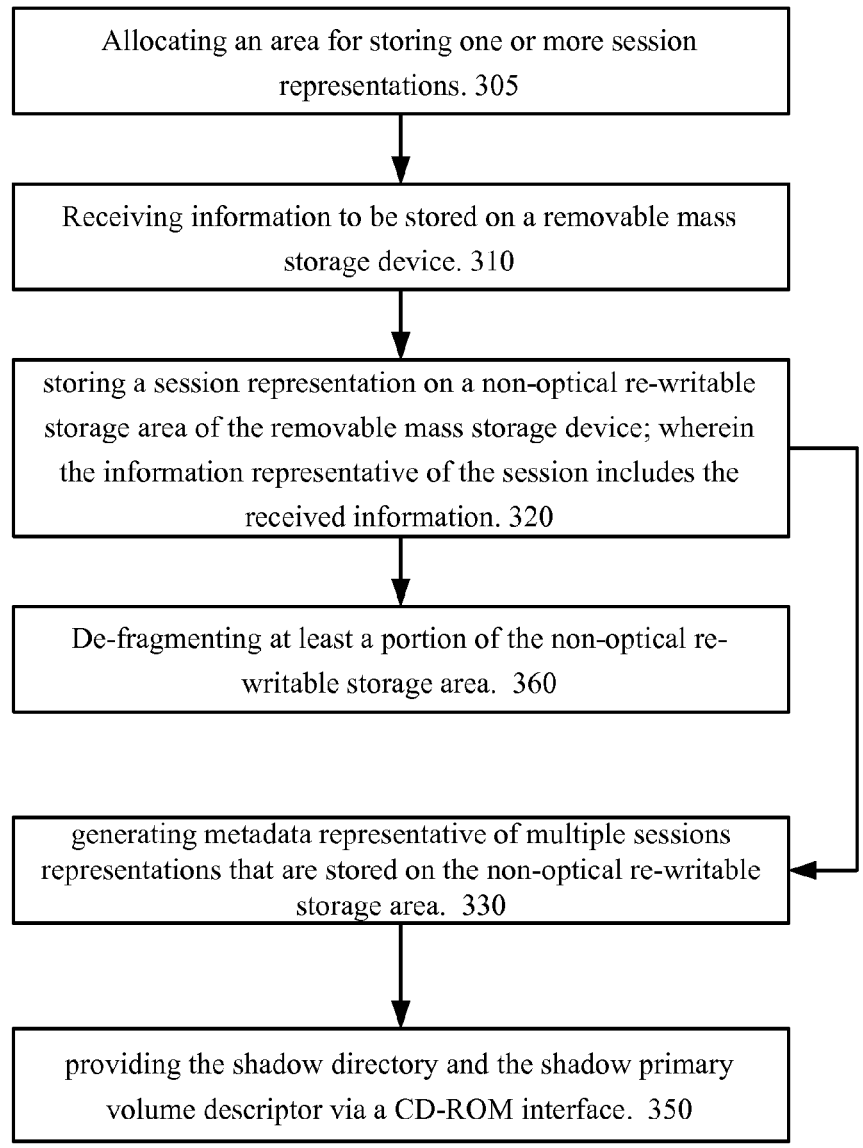
FIG. 8 is a flow chart of a method for storing information, according to an embodiment of the invention.

FIG. 8 illustrates method 300 for storing information according to an embodiment of the invention.

Method 300 starts by stage 305 of allocating an area for storing one or more session representations.

Stage 305 is followed by stage 310 of receiving information to be stored on a removable mass storage device.

Stage 310 is followed by stage 320 of storing a session representation on a non-optical re-writable storage area of the removable mass storage device; wherein the information representative of the session includes the received information.

Conveniently, stage 320 can include at least one of the following operations or a combination thereof: (i) storing a compact Disc recordable (CDR) session representation; (ii) writing a pointer from a session representation to another session representation after the other session representation is successfully written to the non-optical re-writable storage area; (iii) re-using an area allocated for storing an abandoned session representation; (iv) storing a linked sequence of sessions representations; (v) storing information representative of linked sessions representations that are stored in a non-sequential order; (vi) generating a next session link that points to an area that stores information that differs from a session representation; (viii) toggling between areas allocated for storing session representations; (ix) confirming that a session representation was successfully written to the non-optical re-writable storage area.

It is noted that stage 320 can include re-using an area that was previously allocated to a now-abandoned CDR session representation. Additionally or alternatively, stage 320 can include writing a CDR session representation to a reserved area that was not previously used. This can occur when the reserved area can include multiple CDR session representations.

After at least two session representations are generated (for example by a repetition of stage 310 and 320) method 300 proceeds to stage 330 of generating metadata representative of multiple sessions representations that are stored on the non-optical re-writable storage area. The metadata can be a shadow directory. The shadow directory can be pointed by a shadow primary volume descriptor. The shadow directory indicates names and locations of files of multiple sessions representations.

Conveniently, stage 330 can be followed by stage 350 of providing the shadow directory and the shadow primary volume descriptor via a CD-ROM interface.

Conveniently, stage 330 includes at least one of the following operations or a combination thereof: (i) updating the shadow directory in response to an addition of a new CDR representation; (ii) updating the shadow directory in response to a deletion of a new CDR representation; and (iii) generated the shadow directory after obtaining session representations of all valid session representations.

Stage 320 can also be followed by stage 360 of de-fragmenting at least a portion of the non-optical re-writable storage area. It is noted that the de-fragmenting can occur per a predefined repetitions of stage 320, per a certain period, in response to a status of the removable mass storage device, and the like.

After the storage of information is completed, the removable mass storage device can be accessed. When the CDR partition is accessed a controller or an operating system can search for the most updated session representation. The searching can include searching for a next session representation link that points to an area that stores information that differs from a session representation.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method comprising:
   in a removable data storage device with a non-optical re-writable storage area that is contiguous:
   receiving first information from a first compact disk-read only memory (CD-ROM) during a first temporal session;
   storing a first session representation that is based on the first information to a first portion of the non-optical re-writable storage area of the removable data storage device during the first temporal session;
   after storing the first session representation, receiving second information from the first CD-ROM during a second temporal session that is separated in time from the first temporal session by an interim time period during which no information is read from the first CD-ROM and no data is written to the non-optical re-writable storage area;
   storing a second session representation that is based on the second information to a second portion of the non-optical re-writable storage area during the second temporal session; and
   updating the first session representation by writing a first linking pointer from the first session representation stored in the non-optical re-writable storage area to the second session representation stored in the non-optical re-writable storage area, wherein the updating further includes:
   receiving a first hash value associated with the second information at the data storage device from an update application;
   verifying that the second session representation has been written correctly by comparing the first hash value to a second hash value associated with the second session representation; and
   in response to verifying that the second session representation has been written correctly, writing the first linking pointer by updating a pointer associated with the first session representation to point to the second session representation.

2. The method of claim 1, wherein the first session representation is representative of the first information.

3. The method of claim 2, wherein the second session representation is representative of the second information.

4. The method of claim 3, wherein the first information differs from the second information.

5. The method of claim 1, wherein the first portion and the second portion are within a single partition of the non-optical re-writable storage area.

6. The method of claim 1, further comprising providing access by a host of the removable data storage device to the first session representation only after confirmation that the first session representation has been correctly written to the non-optical re-writable storage area.

7. The method of claim 1, further comprising providing access by a host of the removable data storage device to the first session representation and the second session representation as a single session.

8. The method of claim 1, wherein at least one of the first portion and the second portion is an area previously allocated for storing an abandoned session.

9. The method of claim 1, further comprising generating a shadow directory including metadata representative of the first session representation stored in the non-optical re-writable storage area and the second session representation stored in the non-optical rewritable storage area.

10. The method of claim 9, further comprising storing the shadow directory in the removable data storage device.

11. The method of claim 9, further comprising updating the shadow directory in response to one of an addition of a new session representation to the non-optical re-writable storage area and a deletion of a particular stored session representation from the non-optical re-writable storage area.

12. The method of claim 9, wherein the shadow directory indicates names and locations of files of the first session representation and the second session representation.

13. The method of claim 9 wherein generating the shadow directory includes calculating a sector offset of each session representation.

14. A method comprising:
   at a removable data storage device with a non-optical re-writable storage area that stores a first session representation based on first information, wherein the first information is received from a compact disc read-only memory (CD-ROM) during a first temporal session:
   receiving second information from the CD-ROM during a second temporal session that is distinct from the first session temporal session, wherein the second temporal session is separated in time from the first temporal session by an interim time period during which no information is read from the CD-ROM and no data is written to the non-optical re-writable storage area;
   storing a second session representation based on the second information at the non-optical re-writable storage area during the second temporal session;
   updating the first session representation by linking the first session representation and the second session representation by writing a first linking pointer to form a linked sequence of session representations, wherein the linking includes:
   receiving a first hash value associated with the second information at the data storage device from an update application;
   verifying that the second session representation has been written correctly by comparing the first hash value to a second hash value associated with the second session representation; and
   in response to verifying that the second session representation has been written correctly, writing the first linking pointer by updating a pointer associated with the first session representation to point to the second session representation; and
   storing metadata indicating names and locations of files included in at least one of the first session representation and the second session representation in a shadow directory at the non-optical re-writable storage area.

15. The method of claim 14, further comprising in response to a request from a host of the removable data storage device to access data stored at the non-optical re-writable storage area, sending a shadow primary volume descriptor (PVD) to the host, the shadow PVD identifying the shadow directory.

16. The method of claim 15, wherein the shadow PVD enables the host to access the first session representation and the second session representation as a single session via the first linking pointer in the shadow directory.

17. The method of claim 14, further comprising providing access by a host of the removable data storage device to the first session representation only after confirmation that the first session representation has been correctly written to the non-optical re-writable storage area.

18. The method of claim 14, wherein the shadow directory enables a host of the removable data storage device to access the linked sequence of session representations.

19. The method of claim 14, wherein at least one of the first session representation and the second representation is stored at an area previously allocated for storing an abandoned session.

20. The method of claim 14, further comprising storing additional session representations, wherein at least one of the additional session representations is stored in an area previously allocated for storing an abandoned session.

21. The method of claim 14, further comprising storing an additional session representation and storing information representative of linked session representations that are stored in a non-sequential order.

22. The method of claim 14, further comprising storing an additional session representation and generating a next session link that points to an area that stores information that differs from each stored session representation.

23. The method of claim 14, further comprising updating the shadow directory in response to one of an addition of a new session representation to the non-optical re-writable storage area and a deletion of a particular stored session representation from the non-optical re-writable storage area.

24. A removable mass storage device comprising:
   a non-optical re-writable storage area that is contiguous; and
   a controller, the controller adapted to:
      receive first information from a compact disc recordable (CDR) source during a first temporal session;
      store the first information as a first CDR session representation in the non-optical re-writable storage area;
      receive second information from the CDR source during a second temporal session that is separated in time from the first temporal session by an interim time period during which no information is read from the CDR source and no data is written to the non-optical re-writable storage area, wherein the second information is distinct from the first information;
      after storing the first information, store the second information as a second CDR session representation in the non-optical re-writable storage area; and
      update the first CDR session representation by writing a first linking pointer from the first CDR session representation to the second CDR session representation after the second CDR session representation is written to the non-optical re-writable storage area, wherein the updating further includes:
         receiving a first hash value associated with the second information from an update application;
         verifying that the second CDR session representation has been written correctly by comparing the first hash value to a second hash value associated with the second CDR session representation; and
         in response to verifying that the second CDR session representation has been written correctly, writing the first linking pointer by updating a pointer associated with the first CDR session representation to point to the second CDR session representation.

25. The removable mass storage device of claim 24, wherein the controller is adapted to provide the stored first information and the stored second information to a host as a single session compact disk-read only memory (CD-ROM) by retrieving the first information and the second information from the non-optical re-writable storage area and providing the retrieved first information and the second information sequentially to the host.

26. The removable mass storage device of claim 24, wherein the controller is adapted to generate information representative of linked CDR session representations that are stored in a non-sequential order.

27. The removable mass storage device of claim 24, wherein the controller is adapted to generate a next session link that points to a portion of the non-optical re-writable storage area that stores information that differs from the first CDR session representation.

28. The removable mass storage device of claim 27, wherein the controller is adapted to search for the next session link.

29. The removable mass storage device of claim 24, wherein the controller is adapted to generate a shadow directory storing names and locations in the non-optical re-writable storage area of files of multiple CDR session representations.

30. The removable mass storage device of claim 29, wherein the controller is adapted to update the shadow directory in response to one of an addition of a new session representation to the non-optical re-writable storage area, and a deletion of a particular stored session representation from the non-optical re-writable storage area.

31. A data storage device comprising:
   a non-optical re-writable storage area that is a portion of a flash memory, the non-optical re-writable storage area adapted to store multiple session representations, each session representation associated with a corresponding information portion received during a corresponding distinct session; and
   a controller adapted to:
      receive first information from a compact disc recordable (CDR) source during a first temporal session;
      store the first information as a first CDR session representation of the multiple session representations in the non-optical re-writable storage area;
      receive second information from the CDR source during a second temporal session that is separated in time from the first temporal session by an interim time period during which no information is read from the CDR source and no data is written to the non-optical re-writable storage area,
      wherein the second information is distinct from the first information;
      after storing the first information, store the second information as a second CDR session representation of the multiple session representations in the non-optical re-writable storage area; and
      update the first CDR session representation by writing a first linking pointer from the first CDR session representation to the second CDR session representation after the the second CDR session representation is written to the non-optical re-writable storage area, wherein the update further includes:
- receiving a first hash value associated with the second information at the data storage device from an update application;
- verifying that the second CDR session representation has been written correctly by comparing the first hash value to a second hash value associated with the second CDR session representation; and
- in response to verifying that the second CDR session representation has been written correctly, writing the first linking pointer by updating a pointer associated with the first CDR session representation to point to the second CDR session representation.

32. A data storage device of claim 31, wherein all of the information portions are received from a compact disk recordable (CD-ROM) source.

33. A data storage device of claim 32, wherein the controller is further adapted to generate a shadow directory that indicates names and locations of files associated with each of the multiple session representations.

34. A data storage device of claim 33, wherein the controller is adapted to generate the shadow directory after storing the multiple session representations.

35. A data storage device of claim 31, wherein the controller is further adapted to generate a shadow directory based on the metadata, wherein the shadow directory identifies a starting location of each session representation.

36. A non-transitory computer readable medium having computer-readable code embodied therein, the computer-readable code comprising instructions for:
   - receiving first information from a compact disc recordable (CDR) source during a first temporal session;
   - storing the first information as a CDR session representation on a memory;
   - receiving second information from the CDR source during a second temporal session that is separated in time from the first temporal session by an interim time period during which no information is read from the CDR source and no data is written to a non-optical re-writable storage area, wherein the second information is distinct from the first information; and
   - after storing the first information, storing the second information as a second CDR session representation in the memory; and
   - updating the first CDR session by writing a first linking pointer from the first CDR session representation to the second CDR session representation after the second CDR session representation is written to the non-optical re-writable storage area, wherein the updating further includes:
     - receiving a first hash value associated with the second information at the memory from an update application;
     - verifying that the second CDR session representation has been written correctly by comparing the first hash value to a second hash value associated with the second CDR session representation; and
     - in response to verifying that the second CDR session representation has been written correctly, writing the first linking pointer by updating a pointer associated with the first CDR session representation to point to the second CDR session representation.

37. The non-transitory computer readable medium of claim 36, wherein the computer-readable code comprises instructions for:
   - receiving third information from the CDR source; and
   - storing the received third information as a third CDR session representation in the memory during a third temporal session that is distinct from the first temporal session and from the temporal second session.

38. The non-transitory computer readable medium of claim 36, wherein the computer-readable code further comprises instructions for generating information indicating linking of two or more CDR session representations that are stored in a non-sequential order in the non-optical re-writable storage area.

39. The non-transitory computer readable medium of claim 36, wherein the computer-readable code further comprises instructions for generating a next session link that points to a portion of the non-optical re-writable storage area that stores information that differs from the first CDR session representation.

40. The non-transitory computer readable medium of claim 36, wherein the computer-readable code further comprises instructions for searching for the linking pointer.

41. The non-transitory computer readable medium of claim 36, wherein the computer-readable code further comprises instructions for generating a shadow directory that indicates a location of at least one CDR session representation stored in the memory.

42. The non-transitory computer readable medium of claim 41, wherein the computer-readable code further comprises instructions for updating the shadow directory in response to one of an addition of a new CDR session representation in the memory and a deletion of a particular CDR session representation stored in the memory.

43. The non-transitory computer readable medium of claim 36, wherein the first CDR session occurs during the first temporal period and the second CDR session occurs during the second temporal period.

44. A non-transitory computer readable medium having computer-readable code embodied therein for authorizing access to a network, the computer-readable code comprising instructions for:
   - receiving first information to be stored on a data storage device;
   - storing a first session representation in a first portion of a non-optical re-writable storage area of the data memory storage device during a first temporal session, wherein the first session representation comprises the received first information, and wherein the non-optical re-writable storage area is contiguous;
   - storing a second session representation in a second portion of the non-optical re-writable storage area during a second temporal session that is distinct from the first temporal session, wherein the second session representation comprises the second information;
   - generating metadata representative of the first session representation and of the second session representation; and
     - updating the first session representation by writing a first linking pointer from the first session representation to the second session representation after the first session representation and the second session representation are written to the non-optical re-writable storage area, wherein the updating further includes:
       - receiving a first hash value associated with the second information at the data storage device from an update application;

verifying that the second session representation has been written correctly by comparing the first hash value to a second hash value associated with the second session representation; and in response to verifying that the second session representation has been written correctly, writing the first linking pointer by updating a pointer associated with the first session representation to point to the second session representation.

45. The non-transitory computer readable medium of claim 44, wherein the metadata includes a first indication of a location of the first session representation and a second indication of a location of the second session representation.

46. The non-transitory computer readable medium of claim 45, wherein the metadata is included in a shadow directory that is stored in the data storage device.

47. The non-transitory computer readable medium of claim 46, further comprising instructions for updating the shadow directory in response to one of an addition of a new session representation to the non-optical re-writable storage area and a deletion of a particular stored session representation from the non-optical re-writable storage area.

48. The non-transitory computer readable medium of claim 46, wherein the shadow directory indicates names and locations of files of the stored session representations.

49. The non-transitory computer readable medium of claim 44, wherein at least one of the first portion and the second portion is an area previously allocated for storing an abandoned session.

50. The non-transitory computer readable medium of claim 44, further comprising storing an additional session representation and wherein information representative of linked session representations are stored in a non-sequential order.

* * * * *